United States Patent Office 3,074,951
Patented Jan. 22, 1963

3,074,951
SUBSTITUTED DIHYDROPYRIDINE
Herman Levin, San Antonio, Tex., assignor to BJ Service, Inc., Long Beach, Calif., a corporation of Delaware
No Drawing. Filed Mar. 4, 1959, Ser. No. 797,031
2 Claims. (Cl. 260—290)

This invention relates to new pyridine derivatives having anti-corrosive properties and to the method for the preparation of the same.

More in particular this invention relates to the preparation of dihydropyridine.

This application is a continuation-in-part of my prior application Serial No. 425,326, filed April 23, 1954 now abandoned, entitled Corrosion Inhibitor and Serial No. 603,794, filed August 13, 1956 entitled Hydropyridine Derivative now abandoned.

It is an object of the present invention to produce hydrogenated pyridine by simple condensation.

The present invention comprises the use of substances prepared by condensing in a liquid phase aliphatic and aromatic aldehydes with ammonia or an ammonia derivative in such a manner as to produce a substituted hydrogenated pyridine compound having a substituted group or groups containing 6 to 20 carbon atoms of the general formula $$C_5H_{(3+a)}N)R_b$$

wherein $a$ is an integer from 0 through 5 and $b$ is an integer from 1 to 3, and the sum of $a+b$ is greater than 2 and less than 7, and R represents at least one substance selected from the group consisting of alkyl and aryl; which substance is attached to the ring.

These condensations are carried out in the presence of ammonia (liquid or vapor) ammonium carbonate, ammonium sulfate or similar compounds which will release ammonia continuously to the reaction system during the course of the reaction.

| Compound Designation | Chemical Name | Prepared From— | Mol Ratio |
|---|---|---|---|
| F | 3,5-diethyl-2-propyldihydropyridine-(2,3). | n-butyraldehyde | |
| E | 5-amyl-3-ethyl-2-propyldihydropyridine-(2,3). | n-butyraldehyde: n-heptaldehyde. | 2:1 |
| G | 5-amyl-2-methyldihydropyridine-(2,3). | acetaldehyde: n-heptaldehyde. | 2:1 |
| H | 5-amyl-2-propenyl-(1)-dihydropyridine-(2,3). | do | 3:1 |
| I | 5-amyl-3-hexadienylidene-(2,4)-2-pentadienyl; (1,3)-dihydropyridine-(2,3). | do | 7:1 |
| J | 5-amyl-2-ethyl-3-methyldihydropyridine-(2,3). | propionaldehyde: n-heptaldehyde. | 2:1 |

*Example 1 (Compound F)*

21.3 g. (0.14 g.-mole) ammonium carbonate (31 wt. percent NH₃)
81.7 g. (1.13 g.-mole) n-butyraldehyde
heated to a temperature of 63 to 70° C. (145–158° F.) under atmospheric pressure for 60 minutes. A light yellow oil phase (55.6 grams) was recovered. Vacuum distillation at 30 mm. Hg absolute and room temperature, using nitrogen gas, yielded 41 grams of a yellow liquid product which was experimentally found to have a molecular weight of 174. The major portion of the mixed product is 3,5-diethyl-2-propyl-dihydropyridine-(2,3) whose theoretical molecular weight is 179.

*Example 2 (Compound E)*

23 g. (0.15 g.-mole) ammonium carbonate (31 wt. percent NH₃)
32.5 g. (0.28 g.-mole) n-heptaldehyde
40.9 g. (0.56 g.-mole) n-butyraldehyde
heated to a temperature of 64 to 68° C. (147–154° F.) under atmospheric pressure for 30 minutes. A yellow oil phase (63.3 grams) was recovered. Vacuum distillation at 30 mm. Hg absolute and room temperature, using nitrogen gas, yielded 37.2 grams of a yellow liquid product which was experimentally found to have a molecular weight of 210. The major portion of the mixed product is 5-amyl-3-ethyl-2-propyl-dihydropyridine-(2,3) whose theoretical molecular weight is 204.

*Example 3 (Compound G)*

15.8 g. (0.10 g.-mole) ammonium carbonate (31 wt. percent NH₃)
51 g. (0.445 g.-mole) n-heptaldehyde
39.2 g. (0.89 g.-mole) acetaldehyde
heated to a temperature of 25 to 60° C. (77–140° F.) under atmospheric pressure for 24 minutes. A reddish-yellow oil phase (62.5 grams) was recovered. Vacuum distillation yielded a similar colored liquid product. The major portion of the mixed product is 5-amyl 2-methyl-dihydropyridine-(2,3).

*Example 4 (Compound I)*

25 g. (0.16 g.-mole) ammonium carbonate (31 wt. percent NH₃)
32 g. (0.28 g.-mole) n-heptaldehyde
86 g. (1.95 g.-mole) acetaldehyde
heated to a temperature of 32 to 89° C. (90–192° F.) under atmospheric pressure for 105 minutes. A deep reddish-brown oil phase (48.1 grams) was recovered. Vacuum distillation yielded a similar colored liquid product. The major portion of the mixed product is 5-amyl-3-hexadienylidene-(2,4) - 2 - pentadienyl-(1,3) - dihydropyridine-(2,3).

The pyridine ring may be hydrogenated using sodium and alcohol by well known methods.

| Compound Designation | Chemical Name | Compound | Prepared by— |
|---|---|---|---|
| Hydrogenated E | 5-amyl-3-ethyl-2-propyl-tetrahydropyridine. | E | sodium ethanol. |
| Hydrogenated F | 3,5-diethyl-2-propyl-tetrahydropyridine. | F | Do. |
| Hydrogenated G | 5-amyl-2-methyl-tetrahydropyridine. | G | Do. |
| Hydrogenated H | 5-amyl-2-propyl-(1)-tetrahydropyridine. | H | Do. |
| Hydrogenated I | 5-amyl-3-hexyl-(2,4)-2-amyl-tetra-hydropyridine. | I | Do. |
| Hydrogenated J | 5-amyl-2-ethyl-3-methyl-tetrahydropyridine. | J | Do. |

It has been found that these compounds reduce the corrosion of steel as much as 99.91% when exposed to extreme surface conditions at immersion in 15% by weight hydrochloric acid solution at a temperature of 300° F. and a pressure of 6,000 p.s.i., the concentration of the inhibitor being 0.15% by weight based on the concentration of the acid.

It will be evident from the above description that this invention provides new pyridine derivatives which will be of great interest because of their valuable properties to those desiring to protect metal from corrosion.

What is claimed is:

1. As a composition of matter, 5-amyl-2-propenyl-(1)-dihydropyridine-(2,3).

2. As a composition of matter, 5-amyl-3-hexadienylidene-(2,3)-2-pentadienyl-(1,3)-dihydropyridine-(2,3).

References Cited in the file of this patent

UNITED STATES PATENTS 2,516,625 Haury _____ July 25, 1950
2,704,759 Gluesenkamp et al. _____ Mar. 22, 1955

OTHER REFERENCES

Hess et al.: Chem. Abstracts, vol. 8, page 2707 (1914).